(12) United States Patent
Armstrong et al.

(10) Patent No.: US 8,959,479 B2
(45) Date of Patent: Feb. 17, 2015

(54) PRESENTING A CUSTOM VIEW IN AN INTEGRATED DEVELOPMENT ENVIRONMENT BASED ON A VARIABLE SELECTION

(75) Inventors: Andy Armstrong, Hursley (GB); Jonathan Mace, Hursley (GB); Richard Pilot, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 13/102,273

(22) Filed: May 6, 2011

(65) Prior Publication Data

US 2012/0284689 A1    Nov. 8, 2012

(51) Int. Cl.
G06F 9/44    (2006.01)

(52) U.S. Cl.
CPC ... *G06F 8/33* (2013.01); *G06F 8/30* (2013.01)
USPC ........... 717/110; 717/111; 717/112; 717/113; 717/106; 717/108

(58) Field of Classification Search
None
See application file for complete search history.

(56) References Cited

U.S. PATENT DOCUMENTS

| | | | |
|---|---|---|---|
| 6,314,559 B1 * | 11/2001 | Sollich | 717/111 |
| 6,502,233 B1 | 12/2002 | Vaidyanathan et al. | |
| 6,854,111 B1 * | 2/2005 | Havner et al. | 717/163 |
| 7,730,466 B2 | 6/2010 | Wilson | |
| 2006/0136870 A1 | 6/2006 | Wilson et al. | |
| 2008/0313208 A1 | 12/2008 | Hourselt et al. | |

OTHER PUBLICATIONS

"Code Assistance In The Netbeans IDE Java Editor: A Reference Guide," [online] Netbeans.org, [retrieved Jan. 24, 2011] <http://netbeans.org/kb/docs/java/editor-codereference.html>.

"Editing JavaScript," [pm;ome] Netbeans.org, [retrieved Jan. 24, 2011] <http://netbeans.org/kb/65/ide/javascript-editor.html>.

"Major PHP IDE Features Available In PhpED," [online] NuSphere Corp., [retrieved 01-24-201] <http://www.nusphere.com/products/phped_features.htm>.

* cited by examiner

*Primary Examiner* — Qamrun Nahar
(74) *Attorney, Agent, or Firm* — Cuenot, Forsythe & Kim, LLC

(57) ABSTRACT

Within a system comprising a processor and a memory, a method for, within integrated development environment (IDE), presenting a custom view in the IDE based on a variable selection. The method can include selecting a first instance of the first variable in a first portion of program code. Via the processor, the program code can be searched to identify at least a second instance of the first variable in at least a second portion of the program code. Further, via the processor, the custom view can be presented in the IDE to present at least the first portion of the program code and the second portion of the program code based on the identification of the first variable in the second portion of the program code.

24 Claims, 6 Drawing Sheets

200

```
IDE                                              _ □ X
File  Edit  View  Insert  Format  Tools  Help include <iostream>
  using namespace std;
                                262
  int main(int b, int c) {
      b = c + loop(b);           104
      b = b / 2;
      return (b);
  }
        ↕ 210
  int loop(int t) {  ← 230
      // Loop while i is less than 20  ← 240
      int i = 0;
      while (i < 20) {
          cout << i << " = " << t << endl;
          i++;
          ...
          // Maintains invariant
          t *= i;
          t = operate(t, getOpClass());   224   206
      }
      // Return the resulting value of t  ← 242
      return t;  ← 232
  } int operate (int b, opClass c) {
      int a = c.doOp(b);  ← 254
      a = a + 50;                252
      ...
      int x = a * b;
      return x;        274
  }     270    266 class opClass {
      ...
      int doOp(int x) {
          int y = 15;
          y *= y;          256
          x += y;
          return x
      }
      ...
  }
```

FIG. 2

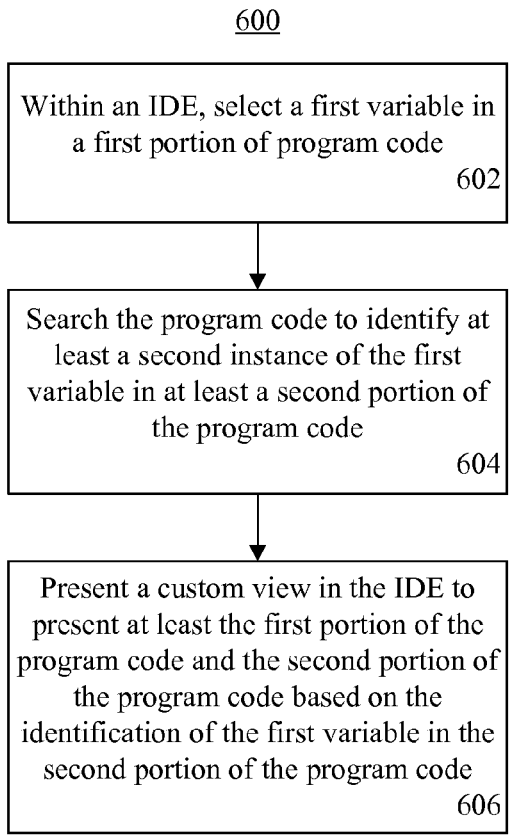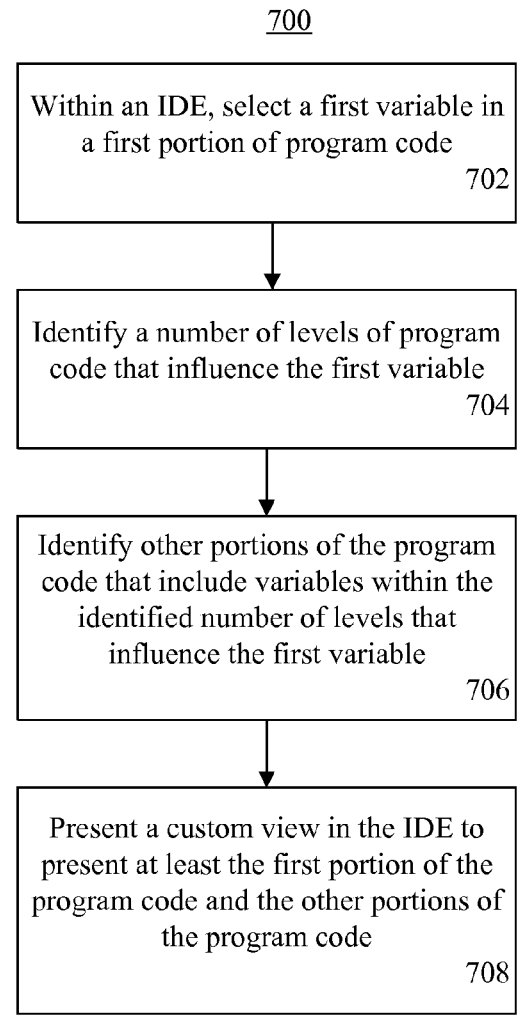
FIG. 6
FIG. 7

PRESENTING A CUSTOM VIEW IN AN INTEGRATED DEVELOPMENT ENVIRONMENT BASED ON A VARIABLE SELECTION

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The embodiments disclosed within this specification relate to computer programming. More particularly, the embodiments relate to integrated development environments (IDE's).

An IDE is a software application that provides comprehensive facilities to computer programmers that are used for software development. An IDE typically present a single application in which the computer program is being developed. This application typically provides many features for authoring, modifying, compiling, deploying and debugging software. In this regard, an IDE normally includes a source code editor, a compiler and/or an interpreter, build automation tools, and a debugger. These tools provide a great deal of functionality designed to improve the efficiency of the computer programmer when developing an application.

An IDE abstracts the configuration necessary to piece together command line utilities in a cohesive unit, which theoretically reduces the time to learn a language, and increases productivity of a computer programmer (e.g., a software developer). It is also thought that the tight integration of development tasks can further increase productivity. For example, code can be compiled while being written, providing instant feedback on syntax errors. In addition, many IDE's allow the programmer to view references to variables used in a computer program, and show where the variables occur in a given class, typically by highlighting their locations next to a scrollbar in an editor. Other tools allow the programmer view where a variable is referenced throughout an application.

BRIEF SUMMARY

An embodiment of the present invention relates to, within a system comprising a processor and a memory, a method for, within integrated development environment (IDE), presenting a custom view in the IDE based on a variable selection. The method can include selecting a first instance of the first variable in a first portion of program code. Via the processor, the program code can be searched to identify at least a second instance of the first variable in at least a second portion of the program code. Further, via the processor, the custom view can be presented in the IDE to present at least the first portion of the program code and the second portion of the program code based on the identification of the first variable in the second portion of the program code.

Another embodiment of the present invention relates to, within a system comprising a processor and a memory, a method for, within integrated development environment (IDE), presenting a custom view in the IDE based on a variable selection. The method can include selecting a first instance of a first variable in a first portion of program code, identifying a number of levels of program code that influence the first variable, and identifying other portions of the program code that include variables within the identified number of levels that influence the first variable. Further, via the processor, the custom view can be presented in the IDE to present at least the first portion of the program code and the other portions of the program code.

Yet another embodiment of the present invention can include a computer program product including a computer-readable storage medium having program instructions that, when executed, causes a machine to perform the various steps and/or functions described herein.

BRIEF DESCRIPTION OF THE SEVERAL VIEWS OF THE DRAWINGS

FIG. 2 depicts a custom view presented within the IDE in accordance with one embodiment of the present invention.

FIG. 6 is a flow chart illustrating a method of presenting a custom view in an IDE based on a variable selection in accordance with an embodiment of the present invention.

FIG. 7 is a flow chart illustrating another method of presenting a custom view in an IDE based on a variable selection in accordance with an embodiment of the present invention.

DETAILED DESCRIPTION

Figure 1:
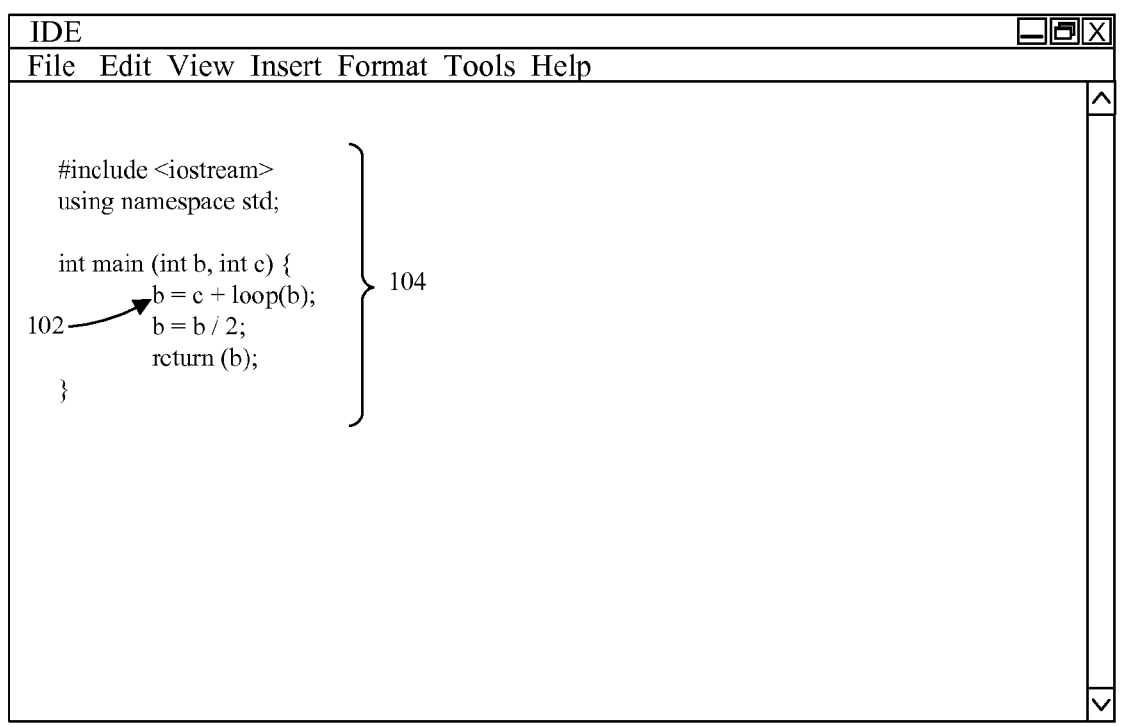
FIG. 1 depicts a view presented within an integrated development environment (IDE) in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium (e.g., a computer readable storage device). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of the present invention relate to, within an integrated development environment (IDE) executed by a processor, presenting a custom view in the IDE based on a variable selection. More particularly, an instance of the variable in a first portion of the program code can be selected. The program code can be searched to identify other instances of the variable in the program code. A current view of the IDE then can be modified to present the first portion and other portions of the program code that contain the variable. Portions of the program code not relevant to the selected variable need not be presented in the current view. Accordingly, the user will be presented only portions of the program code that relate to the variable of interest. The current view can be modified in a number of ways, as will be described herein. A suitable algorithm can be implemented to perform the modifications to the current view.

FIG. 1 depicts a view 100 within an integrated development environment (IDE) in accordance with one embodiment of the present invention. The view 100 can be a view currently presented to a user, such as a computer programmer or software developer. As used herein, an IDE is a software application that provides facilities to computer programmers that are used for software development. Examples of such facilities include, but are not limited to, a source code editor, a compiler and/or an interpreter, build automation tools, and a debugger. The view 100 can be presented within a user interface, such as a user interface of the IDE.

In operation, an instance of a selected variable 102 (e.g., variable "b") within a portion 104 of program code can be selected. The program code can be source code for a computer program, such as a computer application, or any other type of program code. In illustration, the user can select the variable 102 with a cursor of the user interface, for example by navigating the cursor to the variable 102 using a mouse, keyboard, stylus or touch screen. The variable 102 also can be selected using outline tools, selected based on a user entry of the variable 102 into a search field, or selected in any other suitable manner.

In response to the variable 102 being selected, the program code can be searched to identify other instances of the variable 102 within the program code. In illustration, another instance of the variable 102 within another portion of the program code can be identified. In response to identifying another instance of the same variable 102 in the other portion of the program code, the current view 100 within the IDE can be modified or changed to present both the first portion 104 and at least the other portion of the program code in a custom view based on the identification of the first variable in the second portion of the program code. Other portions of the program code need not be displayed; such portions can be hidden from view. In another arrangement, the other portions of the program code can be deemphasized. For instance, such portions of code can be presented with a lightened font color.

Another instance of the same variable means a variable that has the same meaning. For example, if a variable is declared as a field or global variable, that variable will have the same meaning within the different portions of the program code. In illustration, consider the following program code:

```
        int b;
        int methodOne( ) {
            b = 15;
            b++;
            return b;
        }
        int methodTwo( ) {
            b = 17;
            b--;
            return b;
        }
```

Here, the variable "b" is declared globally. Accordingly, the variable "b" in the "methodTwo" portion of the program code is another reference to the same variable "b" used in the "methodOne" portion of the program code.

If, however, a first variable has the name, e.g., "b", but a second variable unrelated to the first variable also has the name "b" (e.g., the first and second variables represent different values, objects or other entities are contained in unrelated portion of program code, respectively), then the second variable would not be the same as the first variable. This may be the case when a variable is declared locally within individual methods or functions. In illustration, consider the following program code:

```
        int methodOne( ) {
            int b = 15;
            b++;
            return b;
        }
        int methodTwo( ) {
            int b = 17;
            b--;
            return b;
        }
```

Here, two different variables with the variable name "b" are declared locally within two different methods. Accordingly, the variable "b" in the "methodTwo" portion of the program code is not another instance of the variable "b" in the "methodOne" portion of the program code; they are different variables.

Moreover, the name assigned to a variable may change among related portions of program code. For example, the name of a variable assigned to an entity may change as the variable transitions through the system. Thus, a variable may be referred to by different names in different places within the program code, even though these references are to the same entity. The present invention can recognize different instances of the same variable when the different instances are assigned different variable names, and process the different instances of the variable as described herein. In illustration, consider the following program code:

```
        void methodOne( ) {
            int x = 15;
            methodTwo(x);
        }
        int methodTwo(int anyname) {
            anyname = anyname + 20;
            return anyname;
        }
```

Here, the variable "anyname" is declared locally within the "methodTwo" method, but passed to the "methodOne" method as variable "x". Accordingly, the variable "anytime" in the "methodTwo" portion of the program code is another instance of the variable "x" in the "methodOne" portion of the program code.

FIG. 2 depicts a custom view 200 presented in the IDE in accordance with one embodiment of the present invention. The custom view 200 can be a modified version of the view 100 of FIG. 1, or can be a new view that is presented in the IDE. The custom view 200 can include the first portion 104 of the program code that includes one or more instances of the variable 102, and the other portion 206 of the program code that was identified as having one or more other instances of the variable 102. Hereinafter, the other portion 206 will be referred to as the "second portion" 206. The use of the ordinal term "second" does not mean that the second portion 206 of program code immediately follows the first portion 104. Indeed, the second portion 206 can be located before the first portion 104, after the first portion 104, or anywhere in the program code.

In one arrangement, the user can be provided a means to toggle between the view 200 and a view (not shown) which includes portions of code hidden or deemphasized in the view 200. Such means can include, for example, a toggle button. The user also can change between the views using one or more keystrokes, by selecting a menu item, or the like.

In one aspect of the invention, the portion of code in which the variable 102 is declared or instantiated can be presented at the top, or close to the top, of the view 200. For example, if the variable 102 is declared or instantiated in the first portion 104, the first portion 104 can be presented at the top of the view 200. Notwithstanding, the second portion 206 can be presented above the first portion 104, or elsewhere with the view 200. In one arrangement, if other lines of code are present in the program code between the first portion 104 and the second portion 206, such lines of code need not be presented in the view 200. In such case, a visual indicator 208 can be presented within the view 200 to indicate that the second portion 206 is not immediately adjacent to the first portion 104 in the program code. Moreover, the indicator 208 also can presented within portions of program code to indicate where lines of code that do not influence the variable 102 are contained in the program code, but not shown. In the present example ellipses are depicted, though any other suitable indicator can be presented.

In one embodiment, if the portions 104, 206 of program code are presented in an order that is different than the order in which the portions 104, 206 are contained in the program code, arrows or other symbols can be presented in the view to indicate such. For instance, an arrowed symbol 210 can be presented between the portions 104, 206.

A determination can made as to whether the variable 102 is influenced by at least a second variable. For example, if the variable 102 is influenced by at least a second variable "t" 222, the second portion 206 of the program code can be presented to include lines of code 224 that influence the second variable 222.

In one embodiment, a determination can be made as to whether the second portion 206 of the program code contains a programming loop that includes the first variable 102 and/or the second variable 224. When the first variable 102 and/or the second variable 224 is contained within a programming loop, the second portion 206 of the program code can be presented so as to include lines of code for the programming loop, for example beginning with a start line of code 230 and ending with an end line of code 232. When the first variable 102 and/or the second variable 224 is contained within a programming loop, and the first variable 102 and/or the second variable 224 effects a termination condition of the programming loop, the second portion 206 of the program code can be presented so as to include each of the lines of code for the entire programming loop.

If the variable 102 is included in a condition, then the line of code containing the condition statement need only be presented in the view 200. If, however, the variable 102 is referenced in a condition evaluator, then the entire condition can be presented in the view 200. This basic logic also can be applied to any other constructs that share similar patterns, for example try/catch, synchronize, branches, events, etc.

The custom view 200 in the IDE further can present comment lines that occur directly before code segments presented in the program code. In illustration, a comment line 240 that occurs directly before program code in the second portion 206 and a comment line 242 that occurs directly after program code in the second portion 206 can be presented in the view 200.

Further, the custom view 200 also can include import or include lines 244 relevant to lines of code within the portions 104, 206, 252, 256 of the program code. Container methods and classes/inner classes in which the variables are referenced, or to which the variables are passed, also can be presented in the view 200, for example in the portion 256 of the program code.

The algorithm that presents the custom view 200 can be recursive in nature so as to identify any desired levels of program code that influence the variable 102. The number of desired levels can be user selectable. In illustration, if a depth of variable search is set to "0", which can be a default setting, the algorithm need only identify portions of the program code that directly influence the variable 102 (e.g., portions of the program code in which the operations are directly performed on the variable 102). If, the depth of the search is set to a higher value, portions of code that influence other variables that influence the variable 102 also can be identified. In other words, the search can be extended to identify other variables that indirectly influence the variable 102. As used herein, a first variable is influenced by a second variable if the value assumed by the first variable depends, at least in part, on the value assumed by the second variable.

For example, if the depth of search is set to "1", a determination can be made as to whether the second variable 222 is modified by at least a third variable 250, for example a variable "a". When the second variable 222 is modified by at least the third variable 250, the custom view 200 of the IDE can be modified to present at least a third portion 252 of the program code. The third portion 252 of the program code can include lines of code that influence the third variable 250. The third portion 252 of the program code further can include a line of code 254 where the third variable 250 is declared or instantiated.

Since the algorithm is recursive, the depth of the search can be set to any other values in order to identify further levels of program code that indirectly influence the variable 102. For example, if the depth of the search is set to "2", portions of the program code that influence the variable "a" 250 also can be identified. For example, a portion of program code 256 can be presented.

One or more visual indicators 260 can be presented within the view 200 of the IDE to visually distinguish the variable 102 from other alphanumeric text in the program code. For instance, the visual indicators 260 can highlight one or more instances of the variable 102, provide a different color of font for the variable 102, or visually distinguish the variable 102 in another suitable manner. Further, the line of code 262 where the variable 102 is declared or instantiated in the program code can be visually distinguished from other lines of code, for example using a visual indicator 264. The line of code 262 can be presented at a top, or near a top, of the view 200, though this need not be the case.

One or more variables that directly influence the variable 102, such as the variable 222 and a variable "x" 266, and/or one or more variables that are directly influenced by the variable 102, also can be visually distinguished from other alphanumeric text in the program code. For example, indicators 268, 270 can be presented to visually distinguish the variables 222, 266. Further, lines of code 230, 274 where the variables 222, 266 are declared or instantiated also can be visually distinguished from other alphanumeric text in the program code, for example using indicators 276, 278.

The visual indicators 264, 268, 270, 276, 278 can be presented in the same style as the indicator 260, but this need not be the case. For example, if highlighting is applied to distinguish the variables 102, 222 and 266, and the lines of code 230, 262 and 274, the visual indicators 260, 264, 268, 270, 276, 278 can be presented in different colors.

In an embodiment in which multiple files are open in the IDE, for example as separate views presented in different tabs, then each of the views can be modified as described herein to present custom views. In illustration, if the variable 102 is contained in three different files, each of which are presented in a separate view, then the view modification algorithm can be applied to each of the views when the variable 102 is selected. The view modification algorithm can modify the existing views or present new views. Alternatively, an option can be provided to the user to select which views are to be modified or to select views for which new custom views are to be presented.

Figure 3:
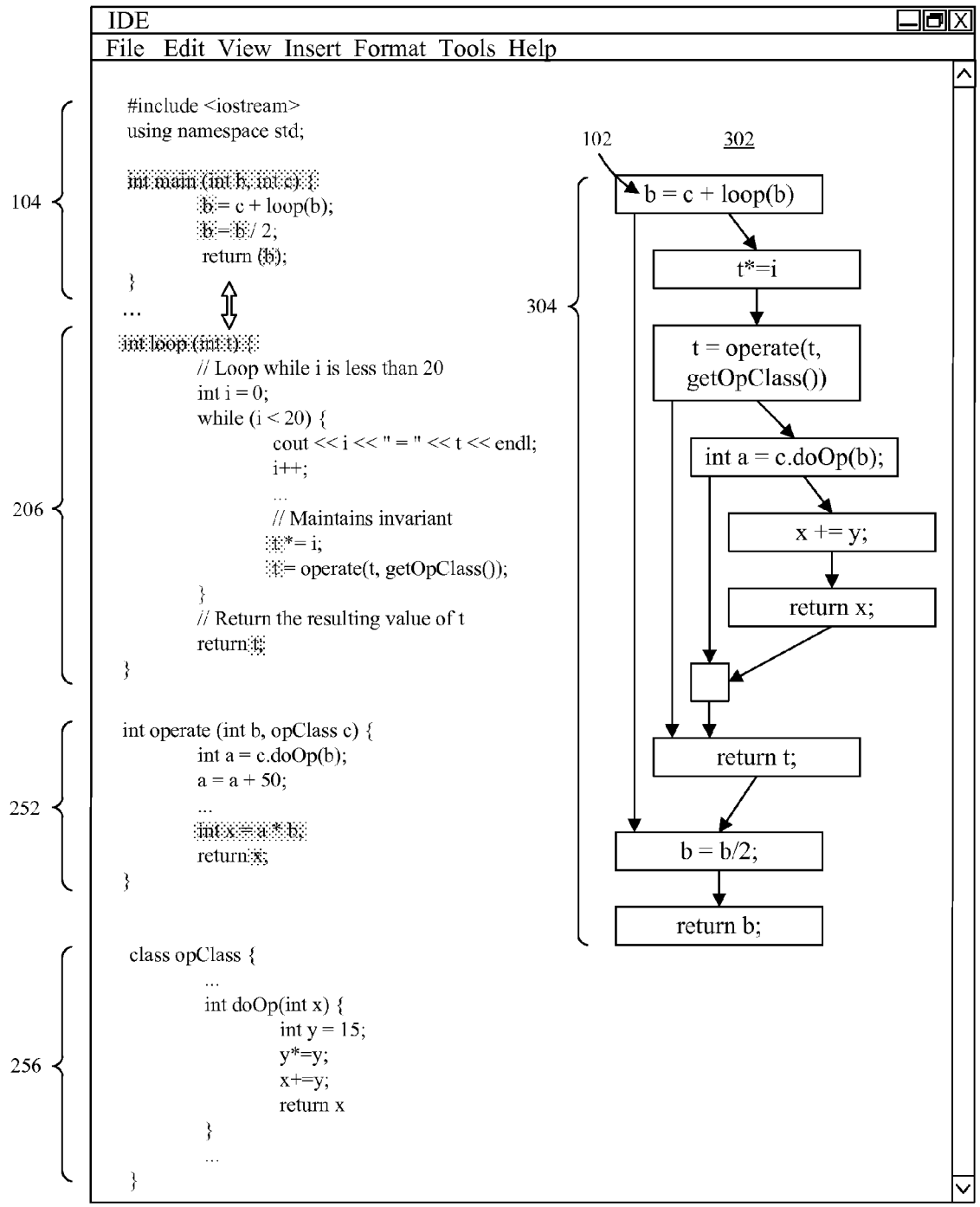
FIG. 3 depicts another custom view presented within the IDE in accordance with one embodiment of the present invention.

FIG. 3 depicts a custom view 300 presented in the IDE in accordance with one embodiment of the present invention. The custom view 300 can be a modified version of the view 100 of FIG. 1, or can be a new view that is presented in the IDE. In the custom view 300, a flow diagram 302 representing the programmatic flow of the variable 102 within the program code can be depicted. In illustration, computations performed on various variables to which the variable 102 directly or indirectly corresponds can be presented, for example as elements 304. In one arrangement, the flow diagram 302 can be based on the position of the variable 102 within the program code where the variable 102 was selected by the user, rather than the entire flow of the variable 102 within the program code. Notwithstanding, this need not be the case. For example, the entire flow of the variable within the program code also can be presented. The determination of which flow to present can be a user selectable option. Further, in one arrangement, the relevant portions 104, 206, 252, 256 of the program code can remain visible, though this need not be the case.

Figure 4:
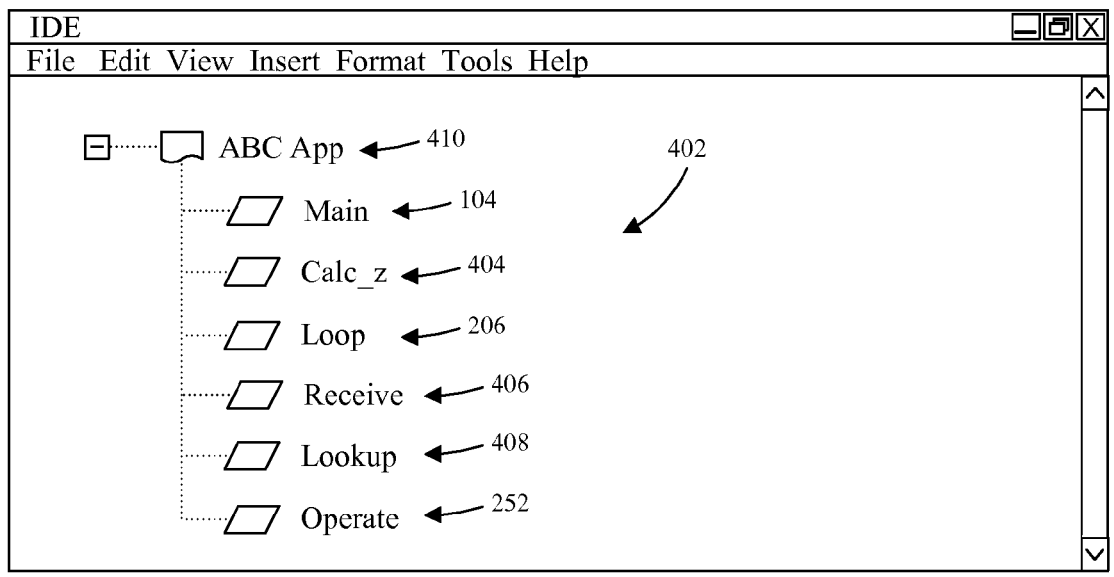
FIG. 4 depicts another view presented within an IDE in accordance with one embodiment of the present invention.

FIG. 4 depicts another view 400 within an IDE in accordance with one embodiment of the present invention. The view 400 can be a view currently presented to a user, such as a computer programmer or software developer. The view 400 can present a tree 402 representing various portions 104, 206, 252, 404, 406, 408 of the program code 416, or files that each contain different portions of the computer program code 410, as nodes of the tree 402. The view 400 can be presented as a tab within the IDE that is distinct from a tab in which the view 100 of FIG. 1 is presented, or presented as a sub-view within the view 100.

In response to the variable 102 of FIG. 1, being selected, and other instances of the variable 102 being identified, the current view 400 within the IDE can be modified or changed to present both the first portion 104 and at least the other portion 206 of the program code in a custom view. The variable 102 can be selected in any suitable manner, as previously described. In one embodiment, the variable 102 can be selected from the view 400, for example in response to a user input as previously described. In another embodiment, the user can select the portion 104 of the program code in the view 400 to initiate presentation of the view 100 of FIG. 1, and the variable 102 can be selected from the view 100.

Figure 5:
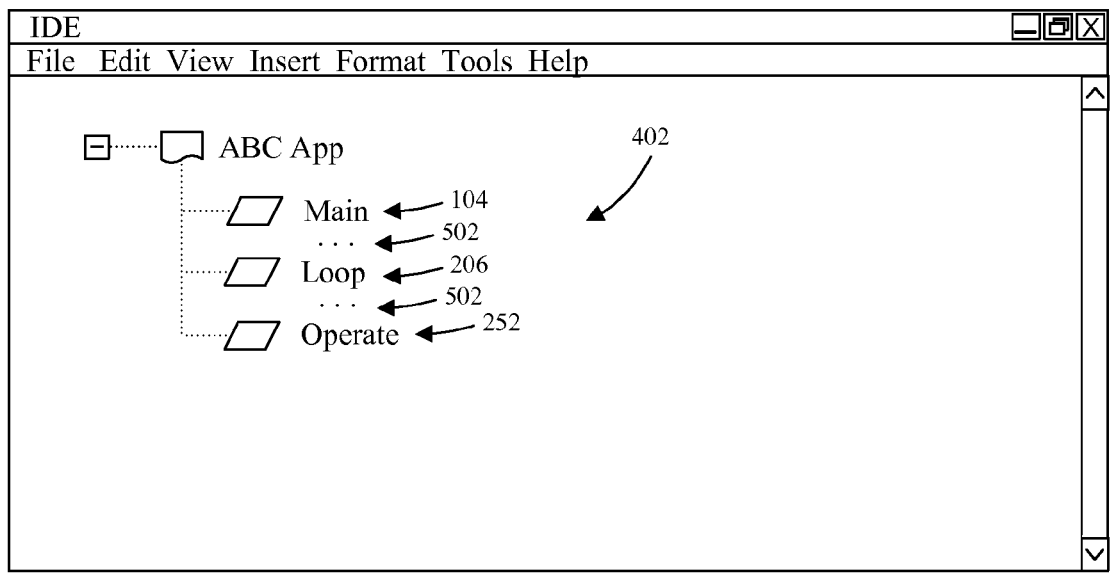
FIG. 5 depicts another custom view presented within the IDE in accordance with one embodiment of the present invention.

FIG. 5 depicts a custom view 500 presented in the IDE in accordance with one embodiment of the present invention. The custom view 500 can be a modified version of the view 400 of FIG. 4, or can be a new view that is presented in the IDE. The custom view 500 can include, as nodes of the tree 402, the first portion 104 of the program code and the other portion 206 of the program code that was identified. If the other portion 252 of program code also was identified, the custom view 500 can present that portion of the program code, as well as any other identified portions.

In the view 500, portions of the program code that are not identified as being related to the selected variable need not be presented in the tree 402. In illustration, the view 500 need not present portions 404-408 of the program code within the tree 402. In such case, one or more visual indicators 502 can be presented within the view 500 to indicate portions of the program code that are not immediately adjacent to one another in the view 400. In the present example ellipses are depicted, though any other suitable indicators can be presented.

In another embodiment, the view 400 of FIG. 4 need not be presented in order to present the view 500 of FIG. 5. For example, the view 500 can be presented in response to a user request when the view 100 of FIG. 1, the view 200 of FIG. 2, or the view 300 of FIG. 3 is presented, regardless of whether the view 400 of FIG. 4 is presented.

FIG. 6 is a flow chart illustrating a method 600 of presenting a custom view in an IDE based on a variable selection in accordance with an embodiment of the present invention. At step 602, within an IDE, a first variable in a first portion of program code can be selected. At step 604, the program code can be searched to identify at least a second instance of the first variable in at least a second portion of the program code. A step 606, a custom view in the IDE can be presented to present at least the first portion of the program code and the second portion of the program code based on the identification of the first variable in the second portion of the program code.

Figure 8:
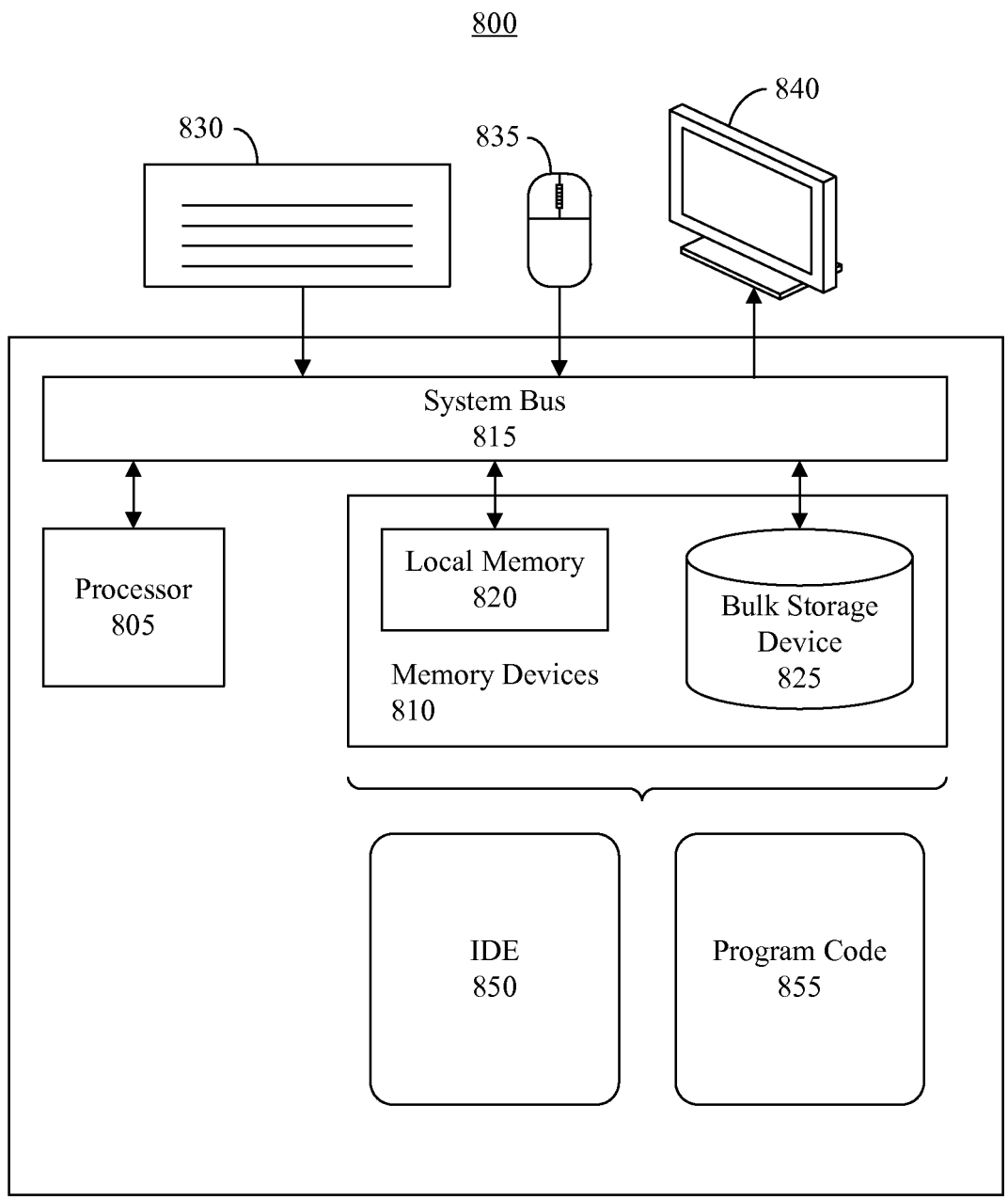
FIG. 8 is a block diagram of a system that presents a custom view in an IDE based on a variable selection in accordance with an embodiment of the present invention.

FIG. 7 is a flow chart illustrating another method of presenting a custom view in an IDE based on a variable selection in accordance with an embodiment of the present invention. At step 702, within an IDE, a first variable in a first portion of program code can be selected. At step 704, a number of levels of program code that influence the first variable can be identified. At step 706, other portions of the program code that include variables within the identified number of levels that influence the first variable can be identified. At step 708 custom view in the IDE can be presented to present at least the first portion of the program code and the other portions of the program code FIG. 8 is a block diagram of a system 800 that presents a custom view in an IDE based on a variable selection in accordance with an embodiment of the present invention. The system 800 can include at least one processor 805 coupled to memory devices 810 through a system bus 815. As such, the system 800 can store program code within the memory devices 810, and access the program code from the memory devices 810. The processor 805 can execute the program code accessed from the memory devices 810 via the system bus 815. In one aspect, for example, the system 800 can be implemented as computer that is suitable for storing and/or executing program code. It should be appreciated, however, that the system 800 can be implemented in the form of any system comprising a processor and memory that is capable of performing the functions described within this specification.

The memory devices 810 can include one or more physical memory devices such as, for example, local memory 820 and one or more bulk storage devices 825. Local memory 820 refers to random access memory or other non-persistent memory device(s) generally used during actual execution of the program code. The bulk storage device(s) 125 can be implemented as a machine-readable storage device, such as hard drive, solid state drive, or other persistent data storage device. The system 800 also can include one or more cache memories (not shown) that provide temporary storage of at least some program code in order to reduce the number of times program code must be retrieved from the bulk storage device 825 during execution.

Input/output (I/O) devices such as keyboard 830, a pointing device 835, and a display 840 also can be coupled to the system 800. The I/O devices can be coupled to the system 800 either directly or through intervening I/O controllers. The I/O devices can receive user inputs into the system 800 and to the user information generated by the system 800.

As pictured in FIG. 8, the memory devices 810 can store program code for an IDE 850. The IDE 850, being implemented in the form of executable program code, can be executed by the system 800 for the purposes of accessing the program code 855 (e.g., source code of an application being developed) and presenting views to the user pertaining to the program code 855. The IDE 850 also can be executed by the system 800 to implement the other methods and processes described herein, for example to receive user inputs and to present custom views within a user interface of the IDE, for example via the display 840.

The flowcharts and block diagram in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. Within a system comprising a processor and a memory, a method for, within integrated development environment (IDE), presenting a custom view in the IDE based on a variable selection, the method comprising:
    selecting a first instance of the first variable in a first portion of program code;
    via the processor, searching the program code to identify at least a second instance of the first variable in at least a second portion of the program code; and
    via the processor, presenting the custom view in the IDE to present at least the first portion of the program code and the second portion of the program code based on the identification of the first variable in the second portion of the program code, wherein the custom view presents a tree representing at least the first portion of the program code and the second portion of the program code as nodes of the tree.

2. The method of claim 1, further comprising:
    determining whether the second portion of the program code contains a programming loop that includes the first variable;
    wherein presenting the custom view in the IDE to present at least the first portion of the program code and the second portion of the program code comprises:
    when the first variable is contained within the programming loop within the second portion of program code, presenting the second portion of the program code to include lines of code for the programming loop, inclusive of a start line of code for the programming loop and an end line of code for the programming loop.

3. The method of claim 1, further comprising:
    determining whether the first variable is contained within a programming loop;
    wherein presenting the custom view in the IDE to present at least the first portion of the program code and the second portion of the program code comprises:
    when the first variable affects a termination condition of a programming loop, presenting the second portion of the program code to include lines of code for the entire programming loop.

4. The method of claim 1, further comprising:
    determining whether the first variable is influenced by at least a second variable; and
    when the first variable is influenced by at least the second variable, presenting the second portion of the program code to include lines of code that influence the second variable or presenting the second portion of the program code to indicate a line of code where the second variable is defined.

5. The method of claim 4, further comprising:
    determining whether the second variable is influenced by at least a third variable; and
    when the second variable is influenced by at least the third variable, modifying the current view in the IDE to present at least a third portion of the program code that contains the third variable, wherein the third portion of the program code includes lines of code that influence the third variable or the third portion of the program code indicates a line of code where the third variable is defined.

6. The method of claim 1, further comprising:
    identifying at least a second variable that is influenced by at least the first variable; and
    within at least one portion of program code selected from the first portion of the program code and the second portion of the program code, providing a visual indicator that visually distinguishes the second variable from other alphanumeric text in the program code.

7. The method of claim 1, wherein modifying a current view in the IDE to present at least the first portion of the program code and the second portion of the program code comprises:
    within at least one portion of program code selected from the first portion of the program code and the second portion of the program code, presenting at least one class or inner class in which the first variable resides.

8. The method of claim 1, wherein modifying a current view in the IDE to present at least the first portion of the program code and the second portion of the program code comprises:
    within at least one portion of program code selected from the first portion of the program code and the second portion of the program code, presenting import or include lines relevant to lines of code within the first or second portions of the program code.

9. The method of claim 1, wherein modifying a current view in the IDE to present at least the first portion of the program code and the second portion of the program code comprises:
    within at least one portion of program code selected from the first portion of the program code and the second portion of the program code, presenting comment lines that occur directly before code segments presented in presented in the program code that is presented.

10. The method of claim 1, further comprising:
    identifying where the first variable is declared or instantiated in the program code;
    wherein modifying a current view in the IDE to present at least the first portion of the program code and the second portion of the program code comprises presenting lines of code in which the first variable is declared or instantiated.

11. The method of claim 10, further comprising presenting a visual indicator that indicates the lines of code in which the first variable is declared or instantiated.

12. The method of claim 1, further comprising:
    modifying the current view in the IDE to present a flow diagram representing a programmatic flow of the first variable in the program code.

13. Within a system comprising a processor and a memory, a method for, within integrated development environment (IDE), presenting a custom view in the IDE based on a variable selection, the method comprising:
    selecting a first instance of a first variable in a first portion of program code;

identifying a number of levels of program code that influence the first variable;

identifying other portions of the program code that include variables within the identified number of levels that influence the first variable; and via the processor, presenting the custom view in the IDE to present at least the first portion of the program code and the other portions of the program code, wherein the custom view presents a tree representing at least the first portion of the program code and the other portions of the program code as nodes of the tree.

14. A computer program product comprising:

a computer readable storage medium having stored thereon computer readable program code that, when executed by a system comprising a processor and a memory, within integrated development environment (IDE), presents a custom view in the IDE based on a variable selection, the computer readable storage medium comprising:

program instructions to select a first instance of the first variable in a first portion of program code;

program instructions to search the program code to identify at least a second instance of the first variable in at least a second portion of the program code; and program instructions to present the custom view in the IDE to present at least the first portion of the program code and the second portion of the program code based on the identification of the first variable in the second portion of the program code, wherein the custom view presents a tree representing at least the first portion of the program code and the second portion of the program code as nodes of the tree;

wherein the program instructions are stored on the computer readable storage medium.

15. The computer program product of claim 14, the computer readable storage medium further comprising:

program instructions to determine whether the second portion of the program code contains a programming loop that includes the first variable;

wherein the program instructions to present the custom view in the IDE to present at least the first portion of the program code and the second portion of the program code comprises:

program instructions to, when the first variable is contained within the programming loop within the second portion of program code, present the second portion of the program code to include lines of code for the programming loop, inclusive of a start line of code for the programming loop and an end line of code for the programming loop.

16. The computer program product of claim 14, the computer readable storage medium further comprising:

program instructions to determine whether the first variable is contained within a programming loop;

wherein the program instructions to present the custom view in the IDE to present at least the first portion of the program code and the second portion of the program code comprises:

program instructions to, when the first variable affects a termination condition of a programming loop, present the second portion of the program code to include lines of code for the entire programming loop.

17. The computer program product of claim 14, the computer readable storage medium further comprising:

program instructions to determine whether the first variable is influenced by at least a second variable; and program instructions to, when the first variable is influenced by at least the second variable, present the second portion of the program code to include lines of code that influence the second variable or presenting the second portion of the program code to indicate a line of code where the second variable is defined.

18. The computer program product of claim 17, the computer readable storage medium further comprising:

program instructions to determine whether the second variable is influenced by at least a third variable; and program instructions to, when the second variable is influenced by at least the third variable, modify the current view in the IDE to present at least a third portion of the program code that contains the third variable, wherein the third portion of the program code includes lines of code that influence the third variable or the third portion of the program code indicates a line of code where the third variable is defined.

19. The computer program product of claim 14, the computer readable storage medium further comprising:

program instructions to identify at least a second variable that is influenced by at least the first variable; and program instructions to, within at least one portion of program code selected from the first portion of the program code and the second portion of the program code, provide a visual indicator that visually distinguishes the second variable from other alphanumeric text in the program code.

20. The computer program product of claim 14, wherein the program instructions to present the custom view in the IDE to present at least the first portion of the program code and the second portion of the program code comprises:

program instructions to, within at least one portion of program code selected from the first portion of the program code and the second portion of the program code, present at least one class or inner class in which the first variable resides.

21. The computer program product of claim 14, wherein the program instructions to present the custom view in the IDE to present at least the first portion of the program code and the second portion of the program code comprises:

program instructions to, within at least one portion of program code selected from the first portion of the program code and the second portion of the program code, present comment lines that occur directly before code segments presented in presented in the program code that is presented.

22. The computer program product of claim 14, the computer readable storage medium further comprising:

program instructions to identify where the first variable is declared or instantiated in the program code;

wherein the program instructions to present the custom view in the IDE to present at least the first portion of the program code and the second portion of the program code comprises program instructions to present lines of code in which the first variable is declared or instantiated.

23. The computer program product of claim 22, the computer readable storage medium further comprising:

program instructions to present a visual indicator that indicates the lines of code in which the first variable is declared or instantiated.

24. A computer program product comprising:

a computer readable storage medium having stored thereon computer readable program code that, when executed by a system comprising a processor and a memory, within integrated development environment (IDE), presents a custom view in the IDE based on a variable selection, the computer readable storage medium comprising:

program instructions to select a first instance of a first variable in a first portion of program code;

program instructions to identify a number of levels of program code that influence the first variable;

program instructions to identify other portions of the program code that include variables within the identified number of levels that influence the first variable; and program instructions to identify present the custom view in the IDE to present at least the first portion of the program code and the other portions of the program code, wherein the custom view presents a tree representing at least the first portion of the program code and the other portions of the program code as nodes of the tree.

* * * * *